US009850150B2

(12) United States Patent
Couch

(10) Patent No.: US 9,850,150 B2
(45) Date of Patent: Dec. 26, 2017

(54) SUBSURFACE SEWAGE DISPOSAL SYSTEM

(71) Applicant: Richard Couch, Woodbridge, CT (US)

(72) Inventor: Richard Couch, Woodbridge, CT (US)

(73) Assignee: Richard Couch, Woodbridge, CT (US)

(*) Notice: Subject to any disclaimer, the term of this patent is extended or adjusted under 35 U.S.C. 154(b) by 108 days.

(21) Appl. No.: 14/432,352

(22) PCT Filed: Oct. 4, 2013

(86) PCT No.: PCT/US2013/063406
§ 371 (c)(1),
(2) Date: Mar. 30, 2015

(87) PCT Pub. No.: WO2014/055838
PCT Pub. Date: Apr. 10, 2014

(65) Prior Publication Data
US 2015/0218025 A1    Aug. 6, 2015

Related U.S. Application Data

(60) Provisional application No. 61/710,033, filed on Oct. 5, 2012.

(51) Int. Cl.
C02F 1/00    (2006.01)
C02F 3/00    (2006.01)
(Continued)

(52) U.S. Cl.
CPC ............ C02F 3/30 (2013.01); C02F 1/006 (2013.01); C02F 3/1242 (2013.01); E03F 1/002 (2013.01);
(Continued)

(58) Field of Classification Search
CPC .......... C02F 3/30; C02F 1/006; C02F 3/1242; C02F 2203/006; C02F 3/106; C02F 3/046;
(Continued)

(56) References Cited

U.S. PATENT DOCUMENTS

| 4,588,325 | A | * | 5/1986 | Seefert | ............... E03F 1/003 210/170.08 |
| 5,597,264 | A | | 1/1997 | Laak | |
| 6,267,882 | B1 | * | 7/2001 | Houck | ............ B01D 24/007 210/170.08 |
| 6,290,429 | B1 | | 9/2001 | Presby | |
| 7,118,669 | B1 | | 10/2006 | Branz | |
| 7,374,670 | B2 | * | 5/2008 | Potts | ................. B09C 1/002 210/150 |

(Continued)

OTHER PUBLICATIONS

PCT/US2013/63406 International Preliminary Report on Patentability dated Oct. 16, 2014, 22 pgs.
(Continued)

Primary Examiner — Nam X Nguyen
Assistant Examiner — Julia L. Wun
(74) Attorney, Agent, or Firm — MKG, LLC

(57) ABSTRACT

A subsurface sewage is provided and includes a plurality of leaching members oriented substantially vertically. A first volume defined within each of the plurality of the leaching members forms a void therein and includes a periphery, a top face that defines a first substantially horizontal plane, and a bottom face that defines a second substantially horizontal plane. A permeable enclosure is wrapped substantially around the periphery of each leaching member and a system frame maintains a location and a position of the plurality of the leaching members. A filter media is disposed in a second volume defined between at least two of the plurality of the leaching members. A leaching member balancing pipe is configured to hydraulically connect at least one of the plurality of the leaching members to at least one other of the plurality of the leaching members. A distribution pipe is configured to hydraulically connect at least one of the plurality of the leaching members to a source of an effluent flow.

25 Claims, 11 Drawing Sheets

(51) Int. Cl.
*E02B 11/00* (2006.01)
*C02F 3/30* (2006.01)
*C02F 3/12* (2006.01)
*E03F 1/00* (2006.01)
C02F 3/04 (2006.01)
C02F 3/10 (2006.01)

(52) U.S. Cl.
CPC ............. *C02F 3/046* (2013.01); *C02F 3/106* (2013.01); *C02F 2203/006* (2013.01); *Y02W 10/15* (2015.05)

(58) Field of Classification Search
CPC ......... E03F 1/002; Y02W 10/15; E02B 11/00; E02B 11/005
USPC ..... 210/170.08, 170.03, 615, 616, 264, 505, 210/500.2; 405/43–47, 50, 51
See application file for complete search history.

(56) References Cited

U.S. PATENT DOCUMENTS

| | | | |
|---|---|---|---|
| 7,762,740 B1* | 7/2010 | Burritt | ................... E03F 1/002 210/170.08 |
| 7,914,230 B2 | 3/2011 | Moore, Jr. et al. | |
| 8,104,994 B1 | 1/2012 | Donlin | |
| 2010/0176044 A1 | 7/2010 | Domb et al. | |
| 2010/0178112 A1 | 7/2010 | Potts | |
| 2010/0276360 A1* | 11/2010 | Smith | ...................... C02F 1/28 210/601 |
| 2011/0062069 A1 | 3/2011 | Couch et al. | |

OTHER PUBLICATIONS

PCT/US2013/063406 International Search Report dated Feb. 7, 2014, 15 pgs.

* cited by examiner

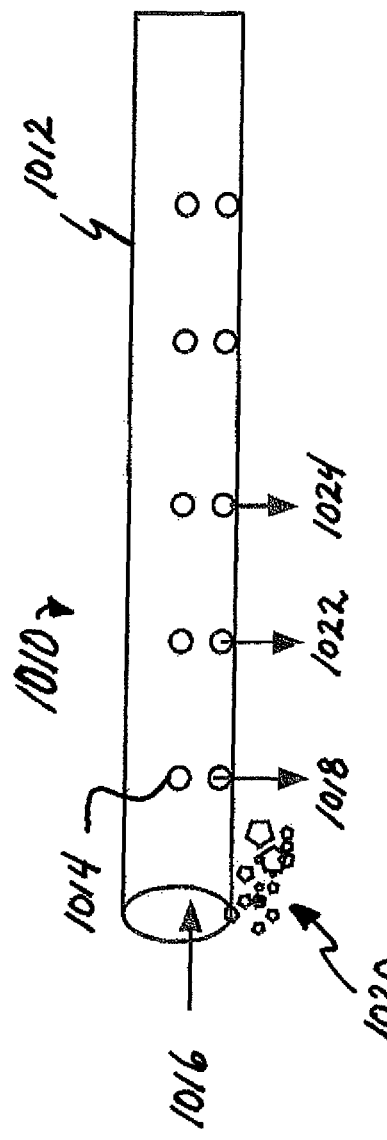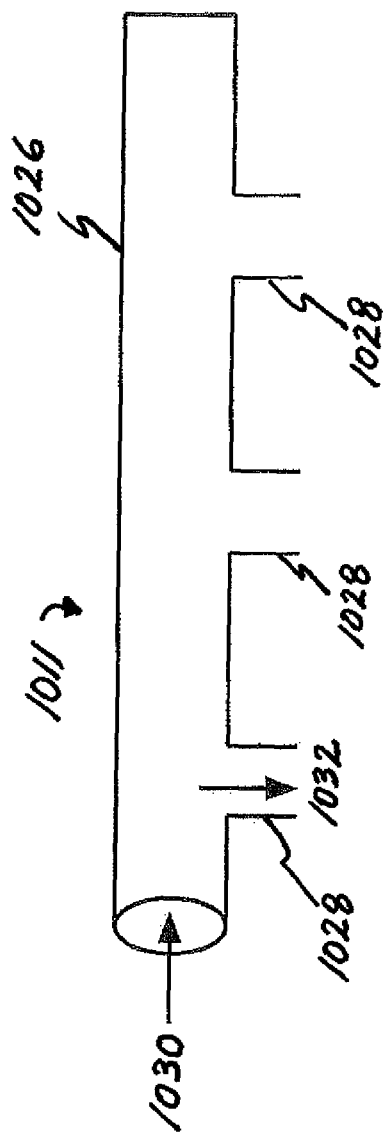
FIG. 1: PRIOR ART
FIG. 2: PRIOR ART

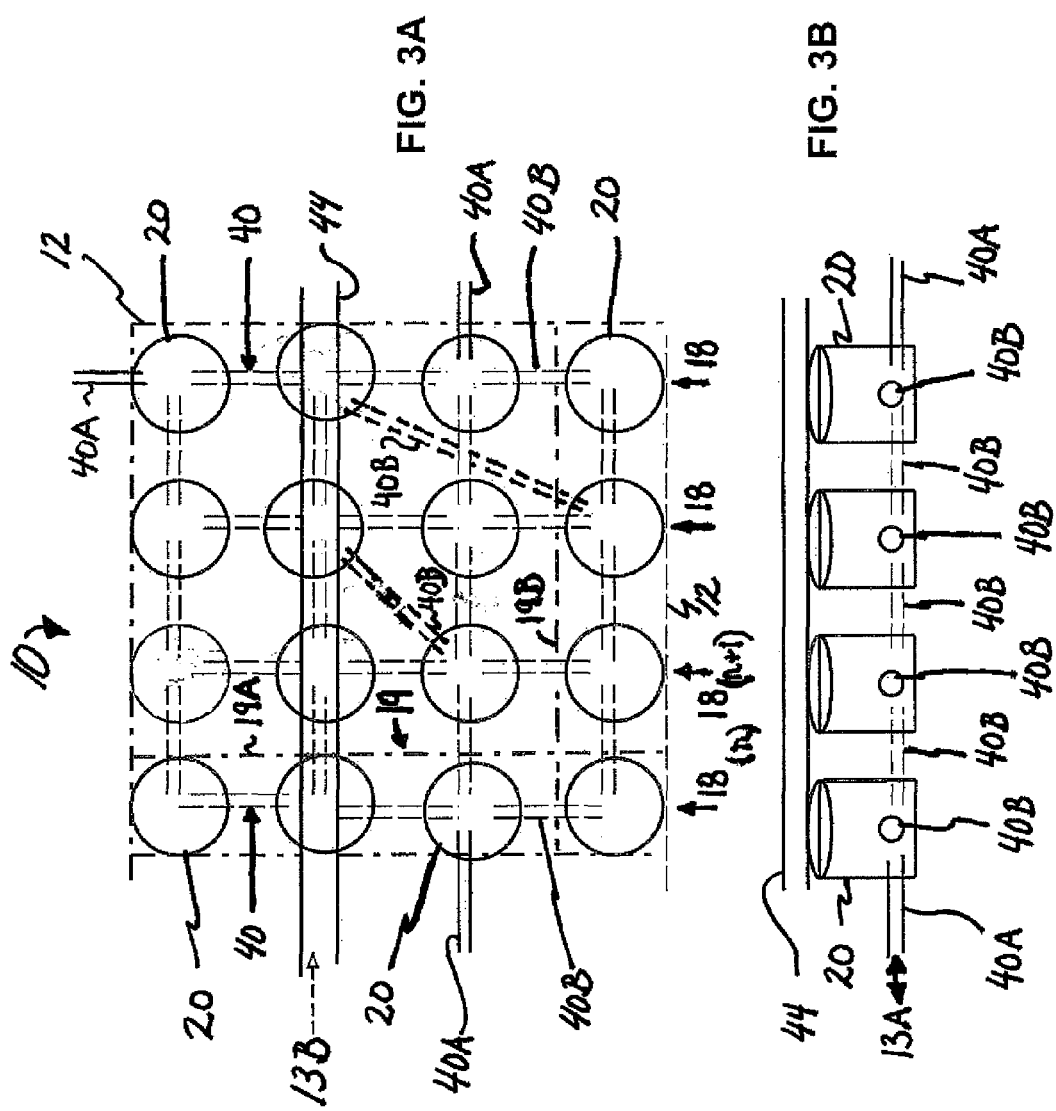

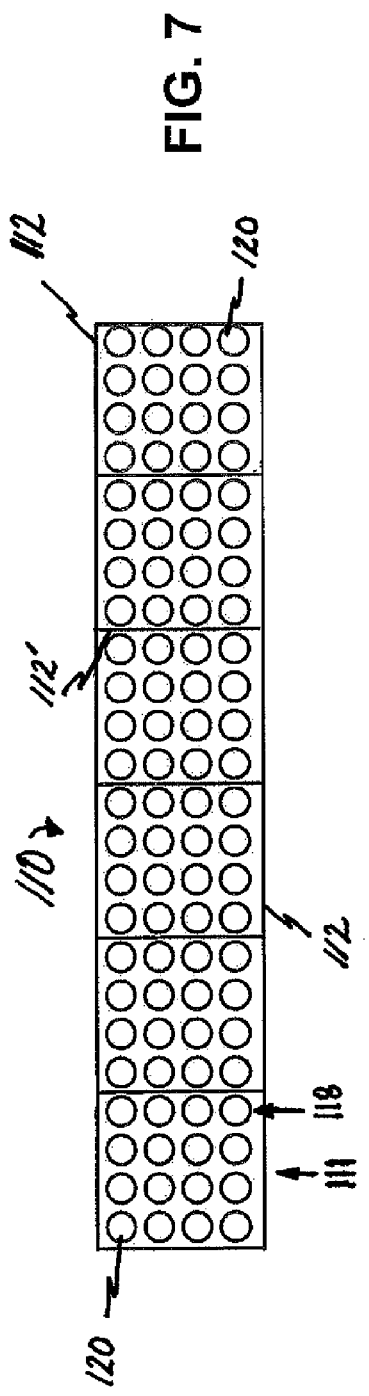
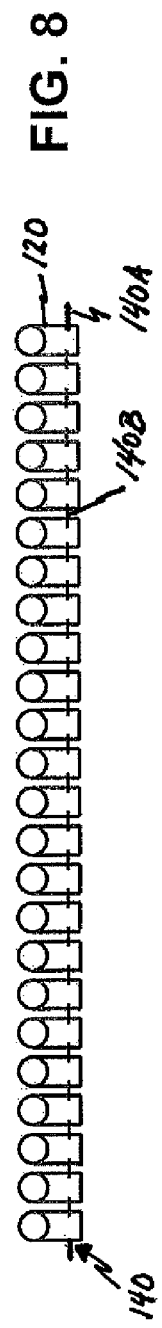
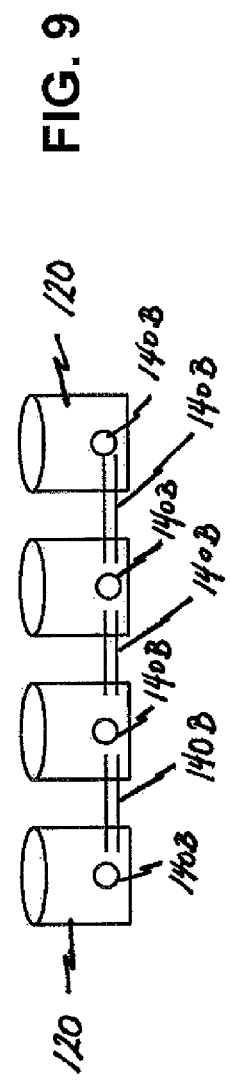

SUBSURFACE SEWAGE DISPOSAL SYSTEM

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to septic systems for the treatment of sewage and, more particularly, relates to a modular, self-contained subsurface sewage disposal system that provides improved effluent distribution with corresponding balanced biomat formation and treatment of effluent within a leach field of the septic system.

BACKGROUND OF THE INVENTION

Septic systems, also known as subsurface sewage disposal systems, are extensively used to treat sewage from individual residences, businesses, schools, churches, military bases, or like structures, in areas not served by sewers. In the treatment of sewage by septic systems, solid and liquid waste from these structures is collected in a septic tank. Because of the different densities of solid and liquid waste, the solid and liquid components of the sewage will separate. The solid material is at least partially decomposed within the tank by the action of aerobic and anaerobic bacteria, resulting in a liquid effluent. The liquid effluent, which may contain suspended solids, is then conveyed out of the tank and distributed through a subterranean area which is typically referred to as a drain or leach field. The liquid effluent is passed to a series of buried temporary containment areas prior to discharge to the surrounding soil. The buried temporary containment areas or leaching trenches have traditionally been constructed of one or a combination of pipe and stone or sand trenches, or chambers within the leach field. Ultimately the effluent must pass through the buried containment area, after receiving pre-treatment, and then percolate through to the soil to receive final treatment before mixing with the underground water table.

Leach fields are typically divided into a number of portions (e.g., the aforementioned buried containment areas and leaching trenches) as dictated by the sewage treatment requirements of the structure serviced. Preferably, the effluent is distributed to the leaching trenches in an even and proportioned manner to minimize over-saturation of any localized area of the leach field. A plurality of underground tubes or pipes connects the septic tank to each of the portions of the leach field. Due in part to excavation needed to reach subsurface components as well as associated material and labor costs, the installation, repair and re-installation of the components of the septic system can be relatively expensive.

As can be appreciated, it is desirable to control installation costs and to extend the useful life of a septic system to minimize maintenance and repair costs. It is also desirable to achieve a high efficiency of treatment surfaces within each linear unit of leach field length to ultimately reduce or at least optimize the extent of the leach field area. It is further desirable to provide subsurface components that can be detected from above the surface to permit post installation location for inspection and/or future maintenance. It is additionally desirable to enable the sewage effluent to be evenly distributed throughout the leaching fields and for the treatment biomat to be able to evenly develop by receiving a balanced flow throughout a leaching system.

It is advantageous to provide a leaching system where the flow of sewage effluent can occur on treatment faces without passing through tortuous paths, corners, or distances that would impair the likelihood of even distribution to the treatment areas of the bottom and sidewalls of leach field components. In addition, it is desirable to isolate and protect the volume contained within a portion of a leaching system, or with a leaching system module, from sedimentation originating from the material used to cover the system. It is further advantageous to provide a means of distributing the liquid sewage effluent throughout the entire width and length of a leach field system regardless of failures that may develop within the system by bypassing the individual areas using bottom based balancing pipes.

The current state of the art includes the use of narrow containment structures configured such that the opposing faces are generally between two (2) inches and twelve (12) inches apart, generally parallel, and claimed to enhance aerobic activity. On some of the narrow systems it is either required or recommended to supplement the system with external air supply because of an inherent lack of oxygen.

Recent innovations in the art have been focused on the configuration of the parallel surfaces; which configuration also provides the mathematical formulation for calculating the maximum treatment surface area per linear foot of a pre-defined width of trench. Government regulators and engineers apply this formulation to define how consumers will utilize the systems. However, the pursuit of micro-level advances to achieve incrementally increasing degrees of treatment in the smallest footprint does not resolve macro-level considerations related to the total proportionate effluent distribution, balanced flow within the entire installed system, and the creation of balanced and even biomat formation.

The aerobic, anaerobic and facultative treatment processes vary with respect to a variety of parameters, such as for example: (i) the type and strength of effluent to be treated; (ii) the climate and climatic influence on the shallow subsurface; (iii) the conditions prevalent in the vertical strata of the region where leaching fields are installed and available having a permeability to provide final treatment and hydraulically convey the treated effluent away without saturation; and (iv) a soil that is free of standing water. Typically, a new leaching system is installed such that its bottom is a minimum distance from observed or historic groundwater, for example, in the area between the land surface and the water table known in the art as the vadose zone. As is known, the thickness of the vadose zone varies as the water table fluctuates in different seasons and during periods of drought.

Typically, there is sufficient oxygen in the shallow unsaturated subsoil environment to provide for aerobic conditions that are appropriate for leaching systems to function with full effect. There is little benefit in providing additional air or oxygen in an adequate air environment. The development of conditions resulting in a failure of a septic system is often the result of a combination of one or more of: a system having been installed where inadequate soil investigation had been performed; where a designer failed to address the basic principles of proper septic system design; the leaching system had been damaged and the effluent was not able to access the entire leaching system and localized over saturation was occurring; effluent was not able to be distributed though the leaching system either by external damage, installation error, or the inherent physical hydraulic overloading of the initial sections of a serial distribution where the initial sections had to be fully loaded to capacity before subsequent sections could receive flow. When saturated conditions are sustained, anaerobic conditions prevail.

The adequate supply of air within a new leaching system and the lack of need to provide supplemental air can be considered as follows. If a design cannot accommodate the inherent available air, the design should be reconsidered. This would be equally true of narrow systems. Such system design failure can be related to a garden pond environment where the pond water is removed by a pump and passed through a filter system. The filter system does not add oxygen to the water. The filter acts to promote biomat development on the filter media and then the water returns to the pond. The oxygen transfer is through the surface interface of the water and the air. The fish flourish. If air were to be added to the pond by aggressive waterfalls or aeration, the fish may still flourish but their condition would remain the same. The supplemental air would be superfluous to requirements and would simply be liberated to the environment. A correctly designed and installed pond and filter does not need additional air. However, if the pond were to have no filter, or the filter levels were failing, and the oxygen levels in the pond were being decreased by biological activity consuming the oxygen, the fish would benefit from the application of additional air.

A correctly designed and installed septic system exists where the air within the shallow soils allows adequate oxygen transfer for full biomat development and full functionality. If one area of a leaching field were to become saturated over prolonged periods, then aerobic activity would be depleted and localized anaerobic conditions would dominate, potentially progressing through the entire leaching system. Such a condition does not have a need to provide oxygen transfer which does not address the problem. Rather, the need is to establish a leaching system which promotes a system where the effluent is evenly distributed to ensure even biomat development. This even distribution is optimally accomplished with a combination of balancing flow pipes and the shape of the receiving leaching system treatment systems. As a result, any localized over-saturation leading to localized failure would be prevented by providing a balanced distribution of effluent throughout the entire leaching trench.

Typically, effluent, the flow that passes to the leaching field, is received from the septic tank as a gravity flow or as a pressure flow from a pump chamber. The effluent flows into a pipe or other conduit within the leaching trenches and thereby enters the leaching system, either chambers or stone trenches, or other horizontal system, in a progressive, serial distribution manner. The conditions of the flow, namely, the receiving volumetric flow rate which is a function of volume and velocity, will be modified by the conditions of the conduit. The conditions of the flow are dictated by many parameters including: the diameter of the conduit; the wetted perimeter of the flow; the depth of the flow; the roughness of the surface material of the conduit; and the temperature, viscosity, available capacity of openings in a pipe encountered during flow and the corresponding reduction in the quantity of flow by effluent leaving the pipe, and density of the effluent. For example, prior art stone-filled trenches include a conduit comprising a typical polyvinyl chloride (PVC) pipe having a diameter in the range of about three (3) inches to about four (4) inches. The effluent flow will pass along the length of the conduit and be contained until it encounters a point of discharge.

As shown in FIG. 1, a prior art conduit 1010 is a perforated pipe 1012 having a plurality of perforations 1014 oriented at the bottom quadrant of the pipe. An effluent flow 1016 is passed to the pipe 1012 at a volumetric flow rate, for example at a rate of five (5) gallons per minute ("gpm"). The effluent flow 1016 discharges via gravity feed through each of the perforations 1014 in a wall of the pipe 1012, where a perforation or hole may be any shape. Typically, a substantial portion 1018 of the effluent flow, for example four (4) gpm, will enter leaching media 1020 disposed about the pipe 1012 only at the initial perforations 1014 along a length of the pipe 1012. Substantially reduced portions 1022 and 1024 of the effluent flow 1016 will enter the leaching media 1020 downstream along the length of the pipe 1012 and at substantially reduced rates such as for example 0.75 gpm and 0.25 gpm, respectively. Similarly and as shown in FIG. 2, the typical prior art flow distribution pattern in a system where flow passes through a prior art conduit 1011 typically comprising a two (2) inch PVC pipe that discharges vertically into a leaching system, a single pipe 1026 having multiple bottom outlets 1028, typically of two (2) inches in diameter, may receive an effluent flow 1030 having a volumetric flow rate of five (5) gpm, wherein an entire volume of effluent flow 1032 may be discharged through a single, first-appearing bottom outlet 1028.

It can be readily understood that if the size of the first hole or perforation, or series of perforations, in a conduit or pipe is sufficiently large in proportion to the hydraulic characteristics of the effluent flow, then the effluent flow will enter the leaching system only at the initial perforation(s) of the pipe. The effluent flow will not pass over such initial perforations until the available capacity of the areas beneath, or being fed by, the perforations are at capacities such that overflow will occur. It can be clearly seen that there is an inherent dominance of the initial portion the state of the art leaching system to receive flow, and the overflow will generally only occur when the first portion is full. Accordingly, the entire leaching system is not being utilized in an even and distributed manner. Rather, the middle and end of the system will only be utilized when the initial areas are fully saturated or over time, when the prolonged saturation of the initial areas has caused anaerobic treatment and potentially system failure, and are no longer functioning or able to receive any significant effluent thereby forcing the distribution to downstream areas of the leaching field.

An example of this type of flow can be observed in a roadway system of catch basins installed in a gutter line when a fire hydrant is being serviced and a flow of water exemplifying a flow of effluent is being discharged into the gutter. The initial flow passes along the gutter and all of it enters the first catch basin. Even if more flow were to be released from the hydrant, the flow would still be captured by the first catch basin. If the flow were to be further increased so that the inlet to the first catch basin was overwhelmed, then the flow would pass into the first catch basin and the extra water would then bypass the first catch basin and flow to the next catch basin down gradient. Over time, and if the first catch basin were to become blocked, as would be the case in a fully saturated leaching trench, a very small quantity would go into the first catch basin and the vast majority of the flow would bypass it and enter the next catch basin. This may still leave the third, fourth and subsequent catch basins completely unutilized.

Accordingly, the inventor has determined that what is needed is a leaching system that incorporates appropriate hydraulic control having a means to force flow to all points of a system and to allow a sufficient rate of flow wherein there would be both entry into the initial perforations and bypass to the subsequent perforations, allowing equal and balanced utilization, until at full design utilization, substantially all of the available capacity of the area beneath, or being fed by, the perforations is at an equal and shared capacity. It is desired that this flow condition occur substantially along the entire length of the leaching system.

As applied to the series of catch basins handling an overwhelming flow as described above, the desired solution would incorporate establishing appropriate hydraulics having a sufficient rate of flow wherein there would be both entry into the first catch basin and bypass to the subsequent catch basins. For example, the flow from the hydrant should be passed along the gutter line in a level and horizontal pipe installed in the length of the gutter line such that the volume of water would be distributed evenly along the length of the gutter line. The pipe would have an outlet positioned on its top at each catch basin. Such a pipe configuration would permit a proportionate flow out of the pipe and to each catch basin wherein no single catch basin would be forced to receive a dominant proportion of the flow and all flow would be proportionate at the same time.

The prior art utilizes a top distribution pipe that receives the flow from the septic tank and distributes the effluent to the leach field through a series of distribution outlets into the top of the leaching areas. The prior art leaching systems vary in depth from about 3 inches to about 48 inches and have shapes comprising a fabric wrapped around a plastic core configured in a serpentine shape, stone filled "u" shapes with the legs originating from the distribution pipe, and cardboard divided stone areas with the leaching areas projecting from the central axis. Other configurations exist, but they are all consistent in that they are dependent upon top feeding. If the top pipe is broken during installation, installed in such a manner wherein the distribution pipe is not level such that a low distribution area is formed, or the main distribution pipe is damaged or impaired during installation, backfilling, or by the use of the land by equipment of the land owner, such as trucks, landscaping equipment or the like, the flow will not occur as designed and hydraulic overloading will occur.

Once the sewage effluent has been discharged into the leaching field in a disproportionate manner, or even if the sewage effluent has been discharged in a proportionate and balanced manner, an additional enhancement or a coupled enhancement is needed to maintain the even and balanced distribution through the entire leaching field which would compensate for the issues related to the errors and inadequacies of top distributed leaching systems. The inventor has determined that what is needed is a hydraulic connectivity that serves to bypass surface distribution pipe failures that can occur from collapse during installation by being compressed by large construction equipment, or by having been installed in such a manner that low points or high points impaired the flow of effluent along the pipe and the effluent entered the system at a concentrated location. In a current condition, this would cause overloading of this individual portion of the leaching field resulting in premature failure. What is needed is a distribution system wherein the effluent would simply be conveyed across and along the full width and length of the leaching field in an equal and balanced manner. What also is needed is a method wherein the aforementioned prior art can be modified or retrofitted to incorporate such hydraulic connectivity to ensure full width and length distribution. The modified or retrofit connectivity should be capable of being installed in "u" shapes, serpentine shapes, "L" shapes, or any other shape where a leaching system has a bottom with a width and a length.

Accordingly, what is needed is a system that provides a reliable quantity of effluent in proportion to the available treatment areas that are being utilized over the life of the system with a minimum of inspection and maintenance of the system. Preferably, the system is non-mechanical and self-adjusting.

SUMMARY OF THE INVENTION

According to aspects illustrated herein, there is provided a subsurface sewage disposal system comprising: a plurality of leaching members oriented substantially vertically; a system frame that maintains a location and a position of the plurality of the leaching members; a leaching member balancing pipe configured to hydraulically connect at least one of the plurality of the leaching members to at least one other of the plurality of the leaching members; and a distribution pipe configured to hydraulically connect at least one of the plurality of the leaching members to a source of an effluent flow.

According to other aspects illustrated herein, there is provided a leaching member of a subsurface sewage disposal system, the leaching member oriented substantially vertically, the leaching member comprising: a volume defined therein having a periphery; a top face defining a substantially circular plane having a first diameter; a bottom face defining a substantially circular plane having a second diameter; a vertical distance between the top face and the bottom face defining a height; and a permeable enclosure wrapped substantially around the periphery.

BRIEF DESCRIPTION OF THE DRAWINGS

FIG. 1 provides a diagram of a progressive distribution of an effluent flow discharge from a typical perforated pipe as is known in the prior art.

FIG. 2 provides a diagram of a typical flow distribution pattern in a typical single solid pipe having multiple bottom outlets as is known in the prior art.

FIG. 3A is a plan view of a subsurface sewage disposal system of the present invention having substantially cylindrical leaching members.

FIG. 3B is a side view of the subsurface sewage disposal system of FIG. 3A.

FIG. 7 is a plan view of a subsurface sewage disposal system of the present invention including six modules wherein each module includes a four-by-four configuration of substantially cylindrical leaching members of FIG. 3A.

FIG. 8 is a sectional view of the subsurface sewage disposal system of FIG. 7.

FIG. 9 is an enlarged view of a portion of the subsurface sewage disposal system of FIG. 7.

DETAILED DESCRIPTION OF THE PREFERRED EMBODIMENTS

Figure 4:
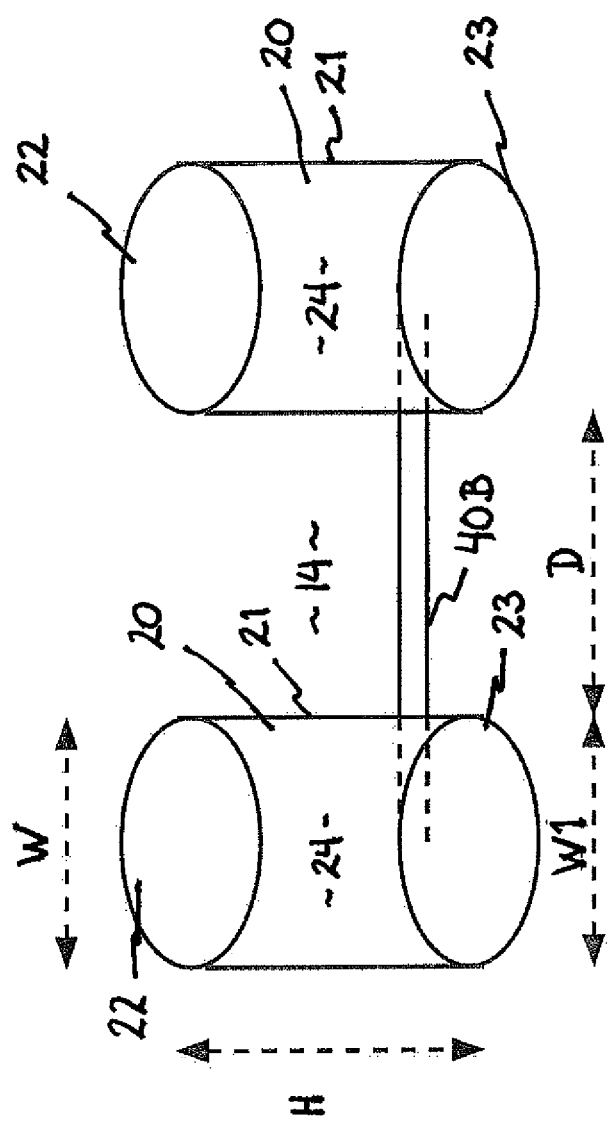
FIG. 4 is an isometric view of an embodiment of substantially cylindrical leaching members of the system of FIG. 3A.

The present invention provides a modular, self-contained subsurface sewage disposal system for use in an improved leach field arrangement. The modular system has the capability to deliver the ideal combination of components, in shape, size, dimension, and materials, along with pre-connected balancing piping, vertical cylinders, geotextile wrap, and open mesh cages, to an installation location for a system that will be able to reliably and predictably distribute effluent to treatment areas within the leaching area in a consistently balanced manner. This reduces overloading of treatment areas and corrects for hydraulic overloading of individual portions of the leaching area. The invention compensates for overloading whether it is by hydraulic means, biological over-production and localized clogging, or by surface damage of the distribution system. It also redistributes the effluent throughout the leaching area and provides a non-linear treatment interface upon which a biomat layer can develop in proportionate and even growth throughout the system.

A flow rising into a circular environment promotes even distribution to the single face of the boundary at all times as the level of the effluent rises. The use of smaller specific leaching areas interconnected by hydraulic flow balancing conduits allows all treatment areas to be equally dosed together. In one embodiment, such smaller specific leaching areas in a leaching field are circular in shape with a vertical height, described herein as a vertical cylinder, and forming a void within. The void can remain air, or be combined in proportions with granular material, such as stone, sand, pea gravel, and the like, and synthetic materials such as polystyrene, plastics, silica fired or glass based products and others.

In one embodiment, as illustrated in FIG. 3A and FIG. 3B, a modular, self-contained subsurface sewage disposal system in accordance with the present invention, referred to generally as system 10, is comprised of one or more leaching members oriented substantially vertically such as cylinders 20 arranged in one or more cells 18. In the embodiment shown, sixteen (16) cylinders 20 are arranged in four (4) cells 18, each cell including four (4) cylinders 20. The system 10 includes a group of connected conduits or pipes 40 that are connected to and between the cylinders 20 and distribute an effluent flow 13A within the system 10 including from one end of the system 10 to the other end, from the middle to each end, and also to each cylinder 20 thereby minimizing or eliminating localized hydraulic overload of individual cylinders 20. The conduits 40 are situated toward the bottom of the cylinders 20 and include at least one balancing pipe 40B for hydraulically connecting at least one cylinder 20 to at least one other cylinder 20.

In one embodiment, conduits 40 also include at least one balancing pipe 40A for hydraulically connecting one cell 18 to another cell, or one system 10 to another system. For example, two balancing pipes 40A are shown extending from system 10. The use of at least one balancing pipe 40B, and preferably a plurality of balancing pipes 40B, for hydraulically connecting the cylinders 20 to one another will provide an even distribution of effluent within the system 10. Moreover, the use of at least one balancing pipe 40A, and preferably a plurality of balancing pipes 40A, for hydraulically connecting at least two cells 18 with one another and/or for hydraulically connecting at least two systems 10 with one another will provide an even distribution of effluent between each cell 18 and/or system 10. Overall, the use of the balancing pipes 40A and 40B will maintain the flow of effluent at a proximal level to the balancing pipes 40B between each cylinder 20 and the balancing pipes 40A between each cell 18 and/or system 10 along the entire leaching system. The system 10 also includes one or more distribution pipes 44 for providing hydraulic connection to the source of the septic effluent flow 13B which may enter the system 10 either above, below, or at some location between or to the side of the cylinders 20.

Referring to FIG. 3A, cylinders 20 are situated in a system frame 12 that maintains their location and position within system 10. In one embodiment, the cells 18 houses four cylinders 20 positioned in series wherein each cylinder 20 is laterally adjacent to at least one other cylinder 20. The system frame 12 includes a cell frame 19, such as for example cell frames 19A and 19B, that together with the system frame 18 defines the four cells 18 and maintains the location and position of the cylinders 20 within the respective cells 18. As shown in FIG. 3A, the cylinders 20 are arranged in four (4) cells 18 to approximate four (4) columns. While a cell 18 having four cylinders 20 positioned in series within a column has been shown and described, the present invention is not limited in this regard as a cell 18 may include more than four cylinders 20 or less than four cylinders 20, and the cylinders 20 may be arranged in rows rather than columns.

As shown in FIG. 4, the cylinder 20 is vertical and circular or substantially circular in cross-section at the top-most portion. This is generally consistent throughout the vertical section, although the diameter can change as the distance away from the top increases. For example, as shown in FIG. 4, the diameter of cylinder 20 is designated by "W"; the height of cylinder 20 is designated by "H"; and the distance between the peripheral boundaries of the cylinders 20 is designated by "D". Typically, H may range from between about 2 inches and about 72 inches or more. Each cylinder 20 has a boundary or periphery 21; a top face 22 which initially comprises a first open circular plane; and each cylinder 20 has a bottom face 23 which generally comprises a second open plane abutting a planar surface formed on or in the ground and configured to receive cylinders 20 of system 10. The cylinder-to-cylinder balancing pipes 40B are positioned in proximity to the bottom faces 23 of adjacent cylinders 20. Additional or alternative balancing pipes 40B may be introduced to provide further hydraulic connectivity. A volume between the adjacent cylinders 20 is generally backfilled with filter media 14 and a volume within the cylinders 20 is generally filled with a void medium 24 which is described in detail herein below.

Figure 5:
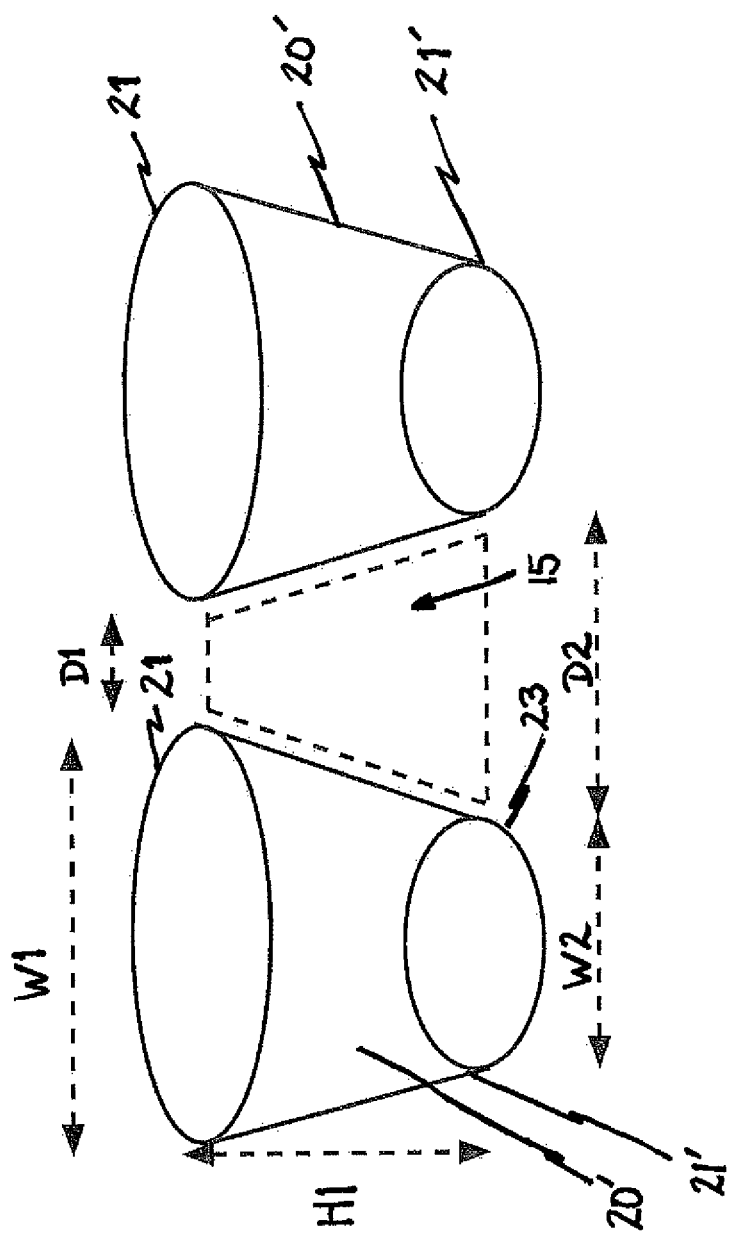
FIG. 5 is an isometric view of another embodiment of a substantially cylindrical leaching member of a subsurface sewage disposal system of the present invention.

An alternate embodiment of the cylinders 20, depicted as cylinders 20' in FIG. 5, has a top diameter W1 that is greater than a bottom diameter W2 such that a distance D1 between the top peripheral boundaries 21 of at least two adjacent cylinders 20' is less than a distance D2 between the bottom peripheral boundaries 21' of the adjacent cylinders 20'. As a result, a trapezoidal section 15 is formed between the adjacent cylinders 20'. While a leaching member has been shown and described as one of the cylinders 20 and 20', the present invention is not limited in this regard as a leaching member may comprise any substantially vertically positioned leaching structure that encloses a volume such as a frustoconical configuration, an oval, an ellipse, a rectangle, a triangle, a curvilinear triangle, a polygon and the like, without departing from the broader aspects of the present invention.

Figure 6A:
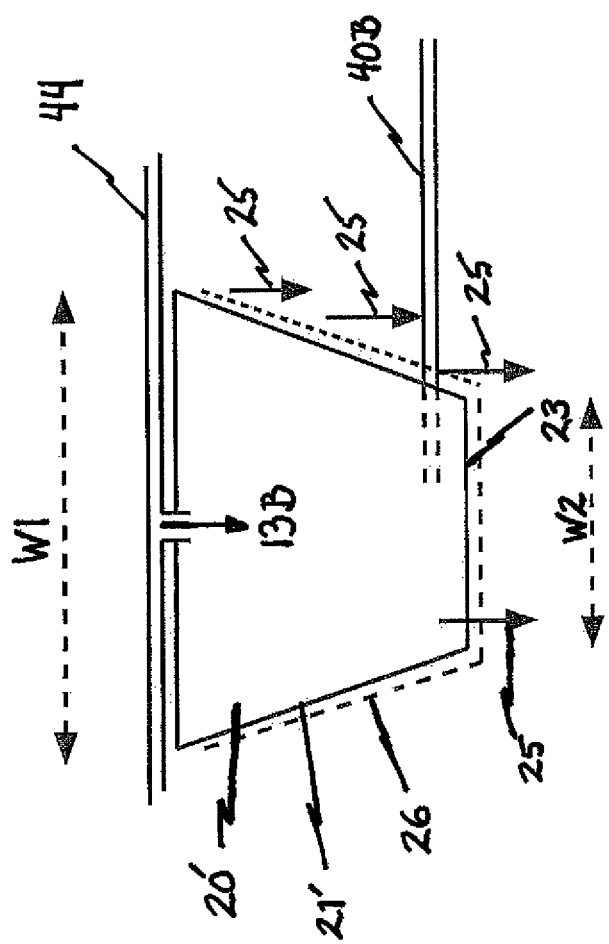
FIG. 6A is a cross section view of the substantially cylindrical leaching member of FIG. 5 showing a biomat boundary.

In general and as shown in FIG. 6A, the configuration of the cylinders 20' wherein W1 is greater than W2 will promote an even discharge of an effluent flow 25 passing from each cylinder 20' along its entire periphery 21' including the bottom face 23. As a result, the configuration of the cylinders 20' promotes an even distribution of the effluent flow 25 to ensure the development of an even biomat layer 26 over the entire periphery 21' of the cylinder 20'. Thus, the effluent flow throughout the leaching area provides a non-linear treatment interface upon which the biomat layer 26 will develop in a more proportionate and even growth throughout the system 10. As also shown in FIG. 6A, the passing of the septic effluent flow 13B from the system distribution pipe 44 into the cylinder 20' promotes an even distribution to the single face of the sidewall periphery 21' providing a compensating pathway into the treatment media as the biomat layer 26 develops on the lower portions of the sidewall periphery 21'. As the level of the effluent rises within the internal volume of the cylinder 20', the balancing pipe 40B allows flow to any connecting leaching member.

Figure 6B:
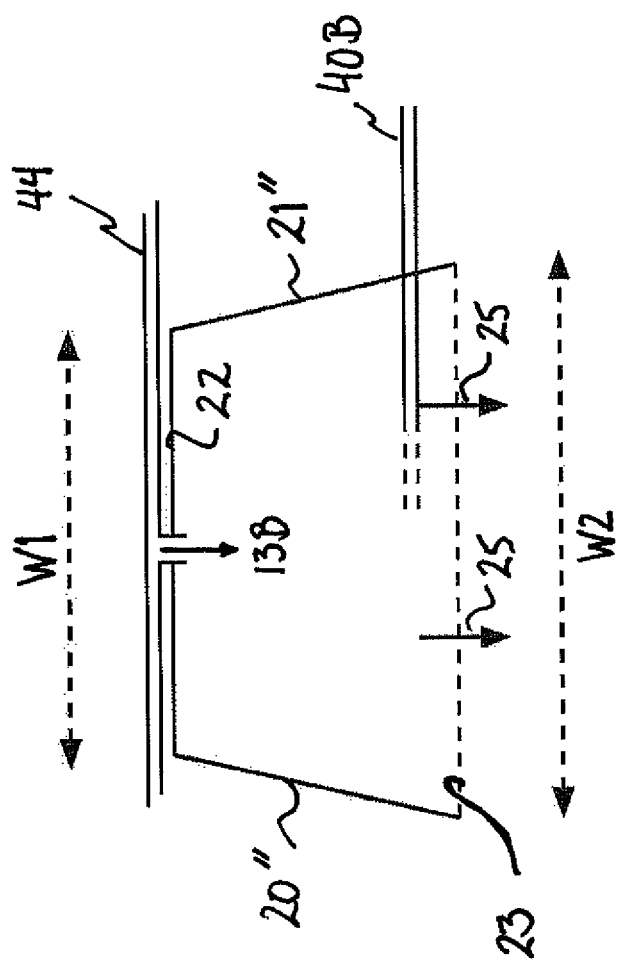
FIG. 6B is a cross section view another embodiment of the substantially cylindrical leaching member for use with a subsurface sewage disposal system of the present invention.

Another embodiment of a substantially cylindrical leaching member for use with system 10 is shown in FIG. 6B. An alternate embodiment of the cylinders 20, depicted as cylinder 20" in FIG. 6B, has a top diameter W1 that is less than a bottom diameter W2. The configuration of cylinder 20" can be referred to as an inverted basket-type configuration 31. The top face 22 of cylinder 20" comprises a "bottom" closed face of the inverted basket-type configuration 31. Cylinder 20" also may define an inverted bowl-type configuration or other frustoconical configuration as described above with reference to cylinders 20' shown in FIG. 5. As also shown in FIG. 6B, the passing of septic effluent flow 13B from system distribution pipe 44 into the cylinder 20" promotes an even distribution to the single face of the sidewall periphery 21". As the level of the effluent rises within the internal volume of the cylinder 20", balancing pipe 40B allows flow to any connecting leaching member. The bottom face 23 of cylinder 20" comprises a "top" open face of the inverted basket-type configuration 31 through which the effluent flow 25 passes from cylinder 20".

Hereafter, references made to cylinders 20 include any of a number of substantially cylindrical configurations such as, for example, cylinders 20' and 20".

A plan view of an embodiment of a subsurface sewage disposal system 110 in accordance with the present invention is depicted in FIG. 7, FIG. 8 and FIG. 9. The system 110 includes six (6) modules 111 wherein each module 111 includes a four-by-four configuration of substantially cylindrical configurations or cylinders 120. The modules 111 include four cells 118, each cell 118 having four cylinders 120. In one embodiment, the modules 111 are bounded by a system frame 112. In another embodiment, each module is bounded by a module frame 112'. The system 110 also includes cylinder-to-cylinder interconnectivity conduits 140 comprised of one or more bottom balancing pipes 140B, a module and/or system balancing pipe 140A, and one or more system distribution pipes 144 (not shown) which may include one or more main feed pipes (not shown).

Figure 10:
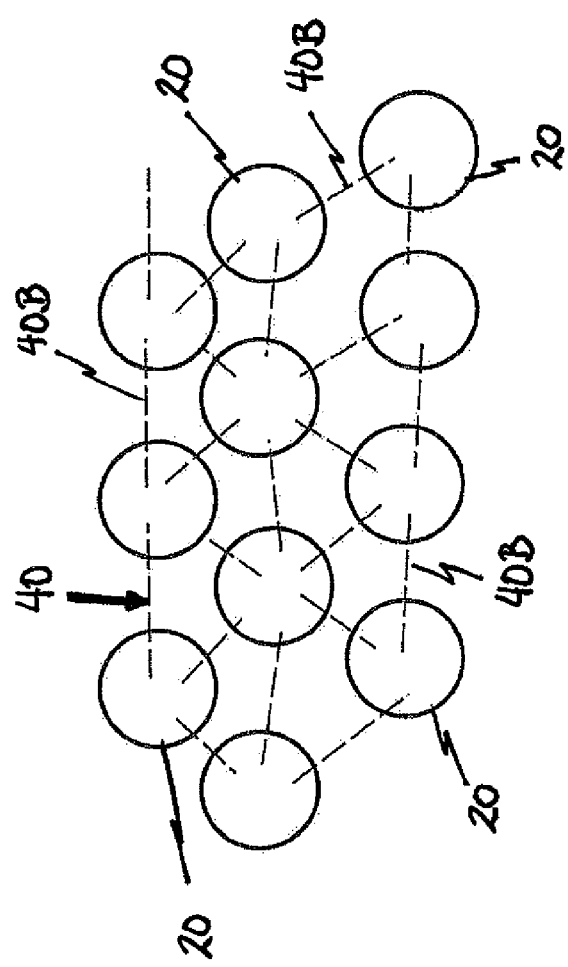
FIG. 10 provides a diagram of a cluster of staggered vertical cylinders with interconnectivity provided by bottom balancing pipes.
Figure 11:
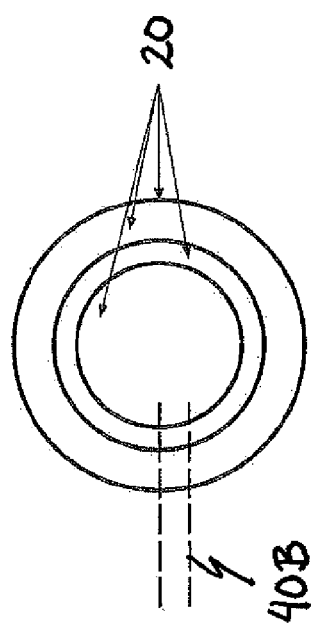
FIG. 11 provides a diagram of a nested arrangement of vertical cylinders with interconnectivity provided by bottom balancing pipes.

As shown in FIG. 10, the cylinders 20 may be positioned individually inside the system 10 in a stepped, staggered, or clustered arrangement. Cylinder-to-cylinder hydraulic connectivity is provided by bottom balancing pipes 40B. As shown in FIG. 11, the cylinders 20 may be positioned individually in a nested arrangement of vertical cylinders 20 with cylinder-to-cylinder hydraulic connectivity provided by bottom balancing pipes 40B.

Figure 12:
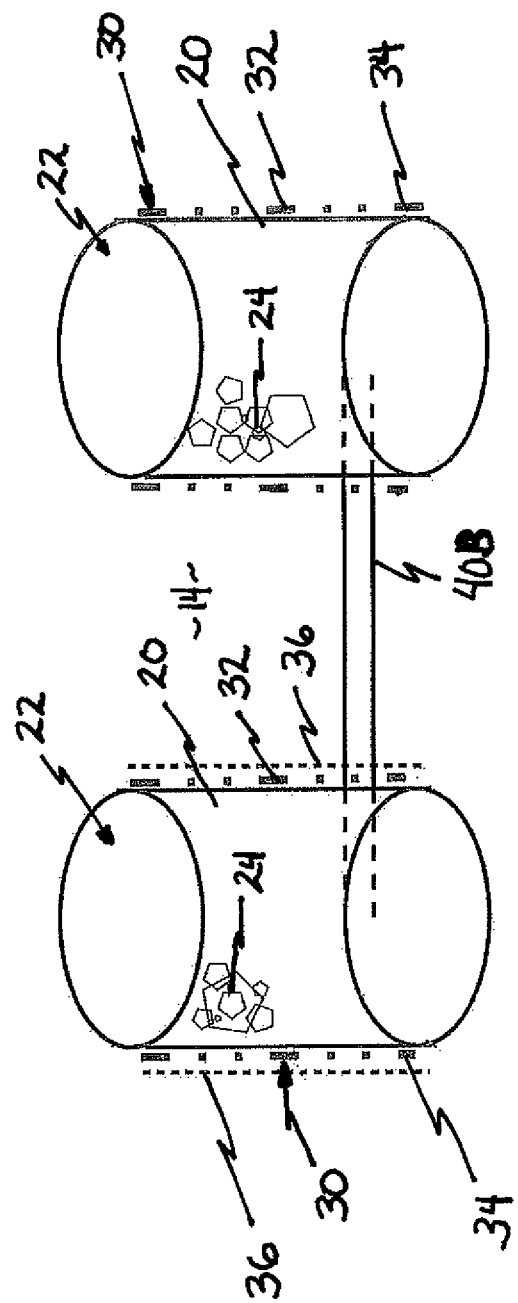
FIG. 12 is an isometric view providing further details regarding the configuration of the substantially cylindrical leaching members of FIG. 3A.

As shown in FIG. 12, the leaching member oriented substantially vertically comprises a porous or free-draining cylinder 20 having a periphery defined by a suitably permeable enclosure 30 generally comprising an open web configuration 32. In one embodiment, permeable enclosure 30 comprises a metallic webbing having open web configuration 32 such as, for example, the metallic webbing commonly referred to as "chicken wire," and forms a cage 34 that defines the periphery of cylinder 20. In one embodiment, enclosure 30 comprises a geotextile fabric webbing having open web configuration 32. In one embodiment, enclosure 30 comprises a synthetic or plastic webbing having open web configuration 32. In one embodiment, permeable enclosure 30 is fabricated from a combination of these materials. In one embodiment, permeable enclosure 30 is wrapped in a woven material 36, for example a geotextile fabric, wrapped around the enclosure. Woven material 36 provides an interface for biomat development, as well as a means of separating the surrounding filter media 14 or treatment soils from the contents of the cylinder, whether they be air, stone, sand, man-made or natural products. The effluent occupies the cylinder 20 as temporary storage prior to passing from the open web configuration 32, through the woven material 36, into the surrounding filter media 14 and then to the surrounding soil, or directly to surrounding soil. The cylinders 20 can be filled after installation, or are pre-filled prior to installation, with the void medium 24 such as sand, stone or the like, or may be left as an open void or a combination of product and open space. The cylinder 20 may be open at its top face 22 thereby allowing it to be easily filled with the void medium 24. A balancing pipe 40B hydraulically connects the cylinders 20.

Figure 13:
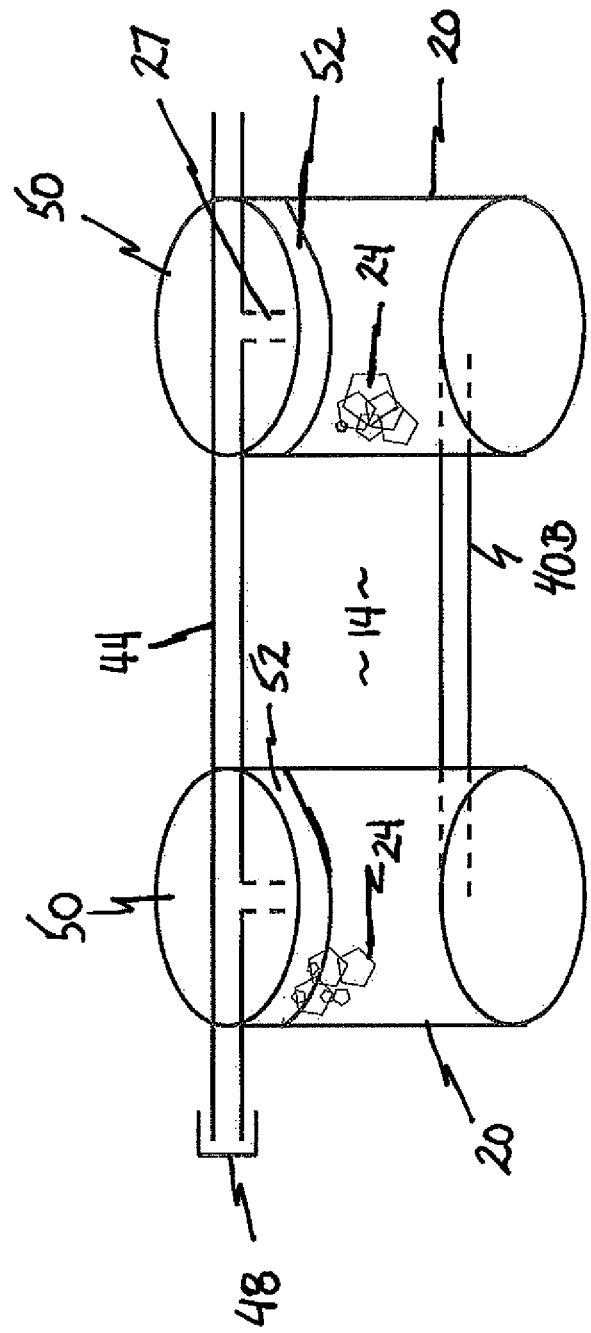
FIG. 13 is an isometric view of the substantially cylindrical leaching member of FIG. 3A having a cap and cover disposed thereon.

In one embodiment, as shown in FIG. 13, the cylinder 20 may have a cover or cap 50 disposed thereon. The cap 50 may have a lip 52 extending downward over a top portion of the sides of the cylinder 20. The entire top portion of the system 10 is typically backfilled in place with either sand, soil or other suitable material. This material is generally detrimental to the operation of a leaching system typically due to its finer particle size than the contents of the vertical cylinder and needs to be isolated from migrating into the surrounding filter media and the cylinders. This is particularly important where the cylinder is to remain open to its interior volume. Once the cylinder 20 is filled with the void medium 24, the cap 50 is placed over the top or top face of the cylinder 20. End caps 48 may be positioned on the bottom balancing pipes 40A and 40B, and on the distribution pipe 44. The cap 50 may be removably fastened to the cylinder 20, and the end caps 48 may be removably fastened to the bottom balancing pipes 40A, 40B, or the distribution pipe 44 by conventional means such as for example via a threaded engagement, protrusions and corresponding receptacles, removable fasteners, a press fit, and the like; or the cap 50 and the end caps 48 may be permanent affixed by conventional means such as for example via an adhesive, permanent fasteners, plastic welding, and the like. In one embodiment, the cap 50 is integrally formed with the cylinder 20. In one embodiment, the end caps 48 are integrally formed with the bottom balancing pipes 40A and 40B. In one embodiment, the end caps 48 are integrally formed with the distribution pipe 44.

The cap 50 and the end caps 48 may be fabricated or may comprise standard commercially available PVC fittings. For example, a 12 inch outside diameter PVC cylinder 20 may have a 12 inch end cap 54 placed on the end. A 7 inch diameter cylinder 12 may have an 8 inch cap 50 placed over it. Similarly, an 11 inch diameter cylinder 20 may have a 12 inch cap 50 placed over it. In addition, the cap 50 necessary for each combination of vertical members or cylinders 20 within a cell 18 is configured for engagement with a respective vertical member or pipe, a cylinder intake 27, extending upwardly from the cylinder 20 and positioned in advance such that each of the intakes 27 is vertically received within a respective cap 50. Further, the intake 27 friction fits and engages and connects to the cap 50 by insertion with a permanent connection achieved with solvent glues or similar techniques for materials used.

Figure 14:
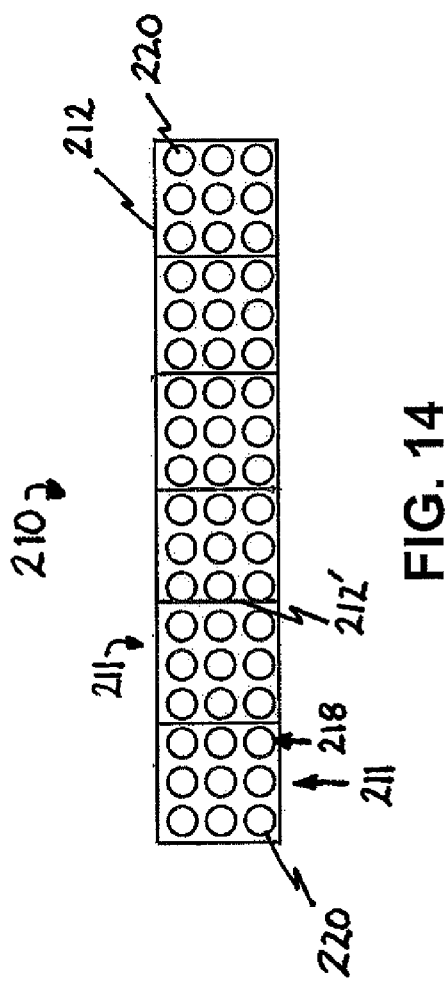
FIG. 14 is a plan view of a subsurface sewage disposal system of the present invention including six modules wherein each module includes a three-by-three configuration of substantially cylindrical leaching members of FIG. 3A.
Figure 15:
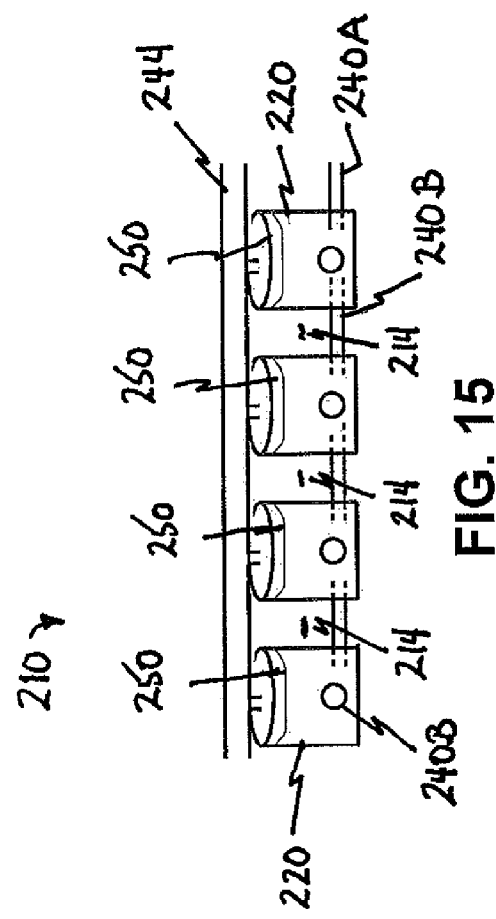
FIG. 15 is a front elevation view of another embodiment of the subsurface sewage disposal system of FIG. 14.

In another embodiment, as shown in FIG. 14, a subsurface sewage disposal system 210 of the present invention comprises six (6) modules 211 wherein each module 211 comprises a grid of three substantially cylindrical leaching members or cylinders 220, each cylinder 220. In one embodiment, a diameter of cylinder 220 may range up to twenty-four (24) inches. The modules 211 include three cells 218, each cell 218 having three cylinders 220. In one embodiment, the modules 211 are bounded by a system frame 212. In another embodiment, each module 211 is bounded by a module frame 212'. As shown in FIG. 15, the system 210 also includes cylinder-to-cylinder interconnectivity conduits comprised of one or more balancing pipes 240B and one or more distribution pipes 244. The balancing pipes 240B, or an additional module-to-module balancing pipe 240A projecting from each module 211, allow direct physical connection into subsequent modules 211 in order to provide full hydraulic connectivity along the entire length of the system 210.

The cylinders 220 are positioned in a three-by-three pattern. In one embodiment, a dimension of one (1) inch separates the closest point on any one cylinder 220 with an adjacent cylinder 220. The top of the module 211 comprises a corresponding configuration of nine (9) caps 250 having distribution pipes 244 installed therebetween. The distribution pipes 244 extend from a single pipe that receives the main flow from distribution piping that runs alongside the entire system 210 or from a designed pressure flow pipe. The underside of the distribution pipes 244 rests on either the top of the configuration of caps 250 or between the cylinders and on a compacted filter medium 214. The distribution pipes 244 are then covered with the surface backfill material that is placed over the entire system 210. Such backfill provides lateral restraint and load distribution from surface applied loads. The system 210 is bounded by a system frame 212. The separating distance between the cylinders can vary from about 1 inch to about 12 inches; particularly given the progressively changing separation of distance, the perimeters are measured in separation to each other. The separating distance can be a function of a combination of providing sufficient space for filter medium to be installed and compacted, which would preclude a separation of 1 inch when using 1½ inch diameter stone, and anticipated biomat development and conflict.

Another embodiment of the bottom balancing pipes is made available for leaching systems having leaching members which were not based on a cylindrical shape. The bottom balancing pipes can be incorporated into all prior art systems where a bottom of a leaching system has a width and a length and the effluent is received into the leaching trench from a top or upper portioned positioned pipe or conduit and where the flow enters at discrete locations in a serial distribution dependent upon successive free flow.

Hereinafter, references to the system 10 include any subsurface sewage disposal system of the present invention described herein such as, for example, the systems 10', 110, 210 and 310. Hereafter, references made to the cylinders 20 include any substantially vertical leaching member described herein such as, for example, the cylinders 20', 20", 120, 220, and the cavity 305. Hereinafter, references to the system frame 12 include any system frame, enclosure, or space that is circumscribed by a boundary-forming material as described herein such as, for example, the enclosure 30 of cylinders 20, the system frames 112, 212, and 312, the module frames 112' and 212', and the location guides 307. Hereafter, references made to the cells 18 include any cells having at least one substantially vertical leaching member as described herein such as, for example, the cells 118 and 218. Hereinafter, references made to the void medium 24 includes all void and cavity filler described herein such as, for example, the cavity filler 303.

The system frame 12 may be fabricated from metal such as, for example, steel, stainless steel, copper, aluminum and the like; the metal may comprise a protective coating such as zinc, a galvanic coating or like corrosion-protection coating; or the metal may comprise a suitable metal alloy. In addition, the metal may comprise a metallic web, wire mesh or chicken wire. Use of a metallic substrate will accommodate the detection of the subsurface components from above the surface to permit post installation location for inspection and/or future maintenance. The system frame 16 also may be fabricated from plastic, wood, woven fabric or matting woven from grasses, or other non-metallic organic or man-made material.

The substantially vertical leaching members, for example cylinders 20, are selectively fabricated from any material, organic or inorganic including synthetic materials or a combination of such materials, which provides temporary storage of effluent within the cylinders 20. The leaching member, container or cylinder is an effluent-receiving object for providing temporary storage and initial treatment of the effluent, and having bottom and side wall interfaces with surrounding media through which the stored effluent will filtrate or exfiltrate. In one embodiment, cylinders 20 selectively comprise standard plastic piping such as commercially available PVC pipes. In another embodiment, cylinders 20 are selectively fabricated from metal or comprise standard metal piping. In other embodiments, cylinders 20 are integrally formed with a periphery defined by a suitably permeable enclosure, for example permeable enclosure 30 as described with reference to FIG. 12.

In another embodiment, such as the inverted basket-type configuration 31, cylinders 20" are fabricated from basket-weave materials, organic strips woven into a container shape, such as reed or cane or like harvested or organic material available or made available at a location where system 10 may be installed. Other materials, organic or inorganic, can be used to form the strips woven into the container shape. The strips are formed by hand or mechanical methods. Using such strips in basket weave process allows for the use of traditional indigenous baskets in an inverted manner. The interconnecting piping selectively comprises hollowed natural material such as bamboo or like harvested or organic material available or made available at a location where system 10 may be installed. Such a system can be formed or installed by various methods including hand placing the containers on the ground in a predetermined pattern having appropriate side-to-side spacing wherein the containers are interconnected with the hollowed natural material piping. At least one container is connected to an outlet of a septic tank, primary settling vessel, or other source of effluent or water to be treated.

The suitable fabrication material and method provides the system frame 12 with a rigid and pliable functionality that is capable of maintaining the cylinders 20 and/or defining the cells 18 in a configuration for use in the system 10. As shown in FIG. 3A, such a configuration includes positioning a first ("n") cell 18 of cylinders 20, and subsequently positioning a second ("n+1") cell 18 adjacent to the former "n" cell 18. The system frame 12 accommodates the positioning, within the system frame 12, of an "n+1" cell 18 adjacent to an "n" cell 18 anywhere within the system 10 including stacking an "n+1" cell 18 on top of an "n" cell 18. Alternatively, the system 10 may simply comprise a number of cylinders 20 positioned in a leaching trench individually with spacing between each cylinder 20 of between about one (1) inch and about twenty-four (24) inches. The system frame 12 also accommodates the positioning, within the system frame 12 of individual "n" and "n+1" cylinders 20 in the same manner as if the cell 18 comprised only one cylinder 20. In addition, the cylinders 20 may be manually configured in a pre-arranged vertical pattern without the need for a system frame 12. The cylinders 20 may be positioned in a matrix configuration wherein each cylinder 20 has the same diameter W and the distance D between each cylinder 20 is substantially the same measurement. Alternatively, the diameter W of the cylinders 20 may be of varying dimensions and the distance D between each cylinder 20 may be of different measurements.

The void medium 24 comprises a porous or free-draining material such as, for example, crushed stone, angular septic stone, pea gravel or similar material, or other like organic or inorganic material including synthetic materials or a combination of such materials. In one embodiment, void medium 24 comprises polystyrene or other manufactured or processed materials. In one embodiment, void medium 24 comprises one or more plastic cores surrounded by a woven material or geotextile fabric. In one embodiment, void medium 24 comprises bone or bone fragments, for example bone fragments heat-treated by fire. The void medium 24 may be prepared such that it is free of dirt and small particles, commonly referred to as "fines," that are found in traditional free-draining material such as septic stone. Otherwise, such fines disposed within the void medium 24 may be flushed to the bottom of the cylinder 20 thereby causing clogging of the draining interface and severely reducing the effectiveness and longevity of the system 10.

The void ratio, or percentage of open space to solid space, of the void medium 24 provides various opportunities for a liquid or air volume to exist in a void. Gravel has a void ratio of approximately forty percent (40%); thus, in a volume of one hundred (100) cubic inches, forty (40) cubic inches would be available for occupation by air or liquid. Filling the void with gravel provides a void medium 24 that is easily obtained in discrete quantities and that can be washed clean from silts and fine materials, or that is certified as being free from silts and fine materials that would normally be washed to the bottom of the system and cause clogging.

The filter media 14 or treatment soils surrounding the leaching members or cylinders 20 selectively comprises an unsaturated subsoil environment or leaching media through which effluent discharged from system 10 further leaches. Such leaching media or filter media 14 selectively comprises stone, sand, or gravel or similar material, or other like organic or inorganic material including synthetic materials or a combination of such materials. In one embodiment, filter media 14 comprises polystyrene or other manufactured or processed materials. In one embodiment, filter media 14 comprises one or more plastic cores surrounded by a woven material or geotextile fabric. In one embodiment, filter media 14 comprises bone or bone fragments, for example bone fragments heat-treated by fire.

The use of pre-formed vertical cylinders 20 positioned within in a system frame 12 with connecting piping also provides a system 10 for use in remote locations. Such a system 10 is advantageous where the only locally available materials needed would be the materials required to create the system frame 12 and to form a void boundary or the enclosure 30 of a cylinder 20. The voids can be filled with void media 24 comprising naturally occurring stones or other granular material as described above, and the filter media can comprise locally available free-draining product, sands, fine gravels or similar materials. The void boundary also can include pre-defined enlarged void areas where additional storage can be provided.

A self-contained and fully assembled or ready-to-be assembled subsurface sewage disposal module or system may be placed on receiving medium or filter media as a system frame having installed therein all of the cell distribution piping, cylinder enclosures or cages, hydraulic balancing pipes within each cell, and spacers and baskets as needed. The system includes fittings or other means for connecting hydraulic balancing pipes and distribution pipes from cell-to-cell or module-to-module. The system also includes a main distribution pipe originating from a source downstream that provides effluent to each series of cells by a direct connection from the main distribution pipe into the cell distribution pipe. A vertical perforated riser is provided at the location of each such connection. The system can be arranged or installed in the field by hand or with mechanical devices. The system can be pre-assembled in a grid without the final connection to a primary settling vessel septic tank, primary settling vessel, or other source of effluent or water to be treated to facilitate installation of the system in the field.

Although this invention has been shown and described with respect to the detailed embodiments thereof, it will be understood by those skilled in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:

1. A subsurface sewage disposal system comprising:
   a plurality of leaching members oriented substantially vertically and positioned in a non-linear arrangement in a self-contained module;

a first volume defined within each of the plurality of leaching members and forming a void therein, the first volume having a permeable enclosure configured to provide temporary storage of an effluent therein, a top face that defines a first substantially horizontal plane, and a bottom face that defines a second substantially horizontal plane;

a filter media disposed in a second volume defined between at least two of the plurality of leaching members;

a distribution pipe configured to introduce the effluent into the plurality of leaching members; and a plurality of balancing pipes configured in a non-linear arrangement to redistribute the effluent introduced into at least one of the plurality of leaching members into at least one other of the plurality of leaching members;

wherein:

as the effluent rises within the at least one of the plurality of leaching members, the effluent is redistributed by at least one of the plurality of balancing pipes to at least one other of the plurality of leaching members; and in the event of a failure of the distribution pipe within the self-contained module, the plurality of balancing pipes is configured to bypass the distribution pipe and redistribute the effluent to the plurality of leaching members downstream of such failure.

2. The subsurface sewage disposal system of claim 1, further comprising:

a plurality of self-contained modules;

wherein, the distribution pipe is configured to introduce the effluent into at least one of the plurality of self-contained modules; and at least one of the plurality of balancing pipes is configured to bypass the distribution pipe and redistribute the effluent to the plurality of self-contained modules;

wherein, as the effluent rises within one of the plurality of self-contained modules, the effluent is redistributed by one of the plurality of balancing pipes to another one of the plurality of self-contained modules.

3. The subsurface sewage disposal system of claim 1, further comprising:

a frame that bounds the self-contained module before, during and after installation of the self-contained module.

4. The subsurface sewage disposal system of claim 1, wherein the top face defines a substantially circular plane having a first diameter, and the bottom face defines a substantially circular plane having a second diameter.

5. The subsurface sewage disposal system of claim 4, the first diameter being greater than the second diameter.

6. The subsurface sewage disposal system of claim 4, the first diameter being less than the second diameter.

7. The subsurface sewage disposal system of claim 1, further comprising:

a void medium disposed within the first volume of at least one of the plurality of leaching members.

8. The subsurface sewage disposal system of claim 7, the void medium comprising one or more of crushed stone, angular septic stone, pea gravel, polystyrene, and bone fragments heat-treated by fire.

9. The subsurface sewage disposal system of claim 1, the filter media comprising one or more of stone, sand, gravel, polystyrene, plastic cores surrounded by a woven material or geotextile fabric, and bone fragments heat-treated by fire.

10. The subsurface sewage disposal system of claim 1, the permeable enclosure defining a substantially cylindrical configuration.

11. The subsurface sewage disposal system of claim 1, the permeable enclosure defining a substantially frustoconical configuration.

12. The subsurface sewage disposal system of claim 1, further comprising:

a biomat layer evenly formed substantially over each of the plurality of leaching members.

13. The subsurface sewage disposal system of claim 1, the permeable enclosure comprising one of a metallic webbing, a geotextile fabric webbing, and a plastic webbing.

14. The subsurface sewage disposal system of claim 1, further comprising a woven material wrapped around the permeable enclosure.

15. The subsurface sewage disposal system of claim 1 further comprising:

a cap positioned over the top face of at least one of the plurality of leaching members.

16. The subsurface sewage disposal system of claim 1, at least one of the plurality of leaching members further comprising an inverted basket-type configuration.

17. The subsurface sewage disposal system of claim 1, at least one of the plurality of leaching members fabricated from a harvested material.

18. The subsurface sewage disposal system of claim 1, wherein the plurality of balancing pipes are situated toward the bottom face of the first volume of the plurality of leaching members connected thereby.

19. The subsurface sewage disposal system of claim 1, wherein:

the self-contained module includes a first end, a second end and a middle extending therebetween; and the plurality of balancing pipes are configured to redistribute the effluent from the first end of the module to the second end, and from the middle of the module to each of the first and second ends.

20. The subsurface sewage disposal system of claim 1, wherein the plurality of leaching members is positioned in one of a stepped, staggered or clustered arrangement.

21. The subsurface sewage disposal system of claim 1, the enclosure comprising perforated commercially available plastic piping.

22. The subsurface sewage disposal system of claim 21, the enclosure comprising perforated PVC piping.

23. The subsurface sewage disposal system of claim 1, the enclosure being integrally formed with the first volume.

24. The subsurface sewage disposal system of claim 1, the enclosure comprising an open web configuration.

25. A subsurface sewage disposal system comprising:

a plurality of leaching members oriented substantially vertically and positioned in a non-linear arrangement in a self-contained module having a first end, a second end and a middle extending therebetween;

a first volume defined within each of the plurality of leaching members and forming a void therein, the first volume having a permeable enclosure integrally formed therewith configured to provide temporary storage of an effluent therein, a top face that defines a first substantially horizontal circular plane, and a bottom face that defines a second substantially horizontal circular plane;

a void medium disposed within the first volume of at least one of the plurality of leaching members;

a filter media disposed in a second volume defined between at least two of the plurality of leaching members;

a distribution pipe configured to introduce the effluent into the plurality of leaching members; and a plurality of balancing pipes configured in a non-linear arrangement to redistribute the effluent introduced into at least one of the plurality of leaching members into at least one other of the plurality of leaching members and to redistribute the effluent from the first end of the module to the second end, and from the middle of the module to each of the first and second ends, the plurality of balancing pipes situated toward the bottom of the leaching members connected thereby;

wherein:

as the effluent rises within at least one of the plurality of leaching members, the effluent is redistributed by at least one of the plurality of balancing pipes to at least one other of the plurality of leaching members; and in the event of a failure of the distribution pipe within the self-contained module, the plurality of balancing pipes is configured to bypass the distribution pipe and redistribute the effluent to the plurality of leaching members downstream of such failure.

* * * * *